Oct. 2, 1934.  F. A. BRUNNER  1,975,445
DISPENSER FOR TOOTHPICKS AND THE LIKE
Filed April 28, 1933
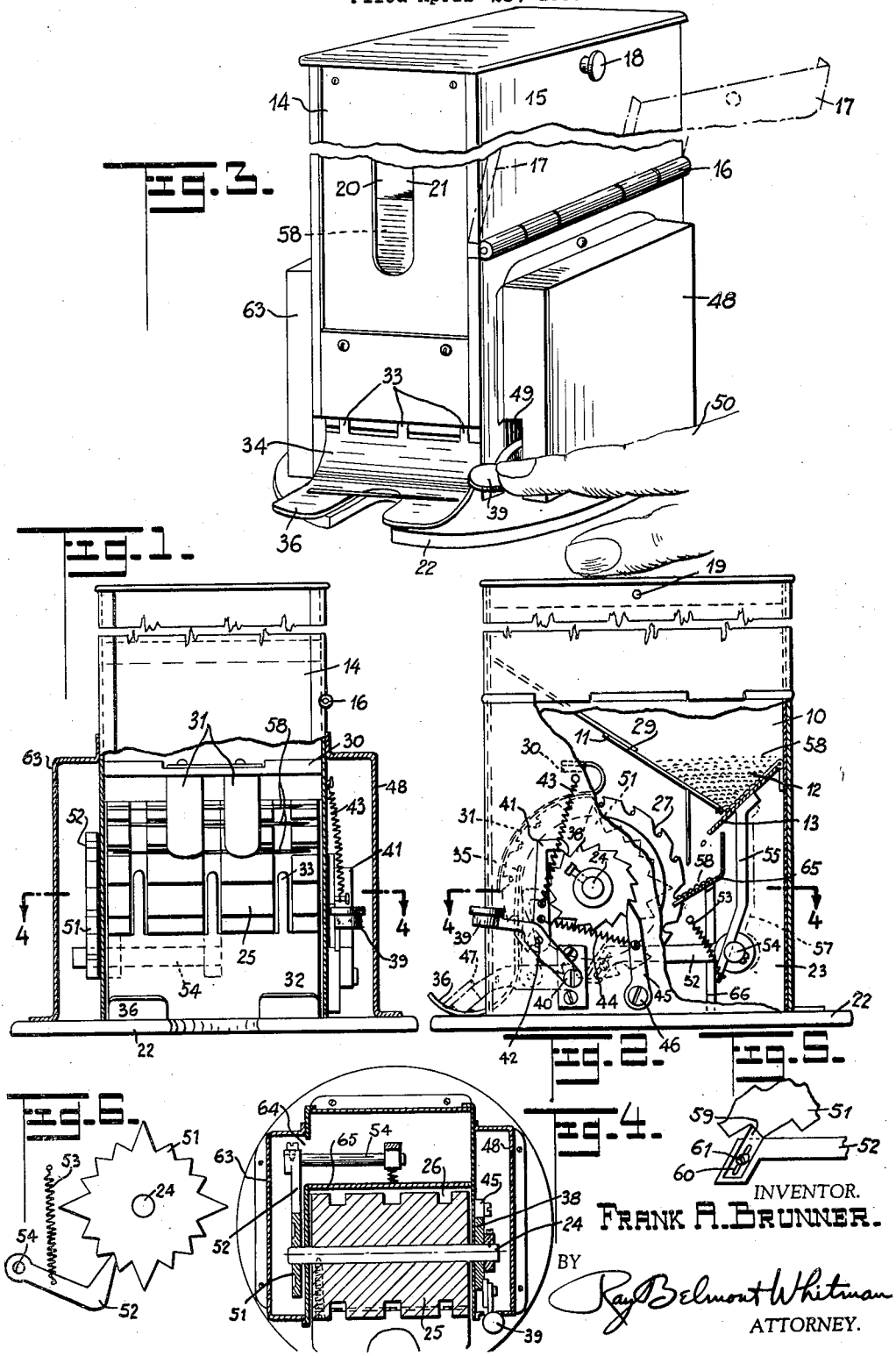

Patented Oct. 2, 1934

1,975,445

UNITED STATES PATENT OFFICE 1,975,445

DISPENSER FOR TOOTHPICKS AND THE LIKE

Frank A. Brunner, Brooklyn, N. Y.

Application April 28, 1933, Serial No. 668,310

3 Claims. (Cl. 312—84)

This application is a continuation-in-part of applicant's co-pending patent application Ser. No. 555,208, filed August 5, 1931, for Sanitary toothpick server.

This invention relates to new and useful improvements in a dispenser for toothpicks and the like.

The invention has for an object the construction of a toothpick dispenser which is characterized by a toothpick compartment having an inclined bottom with an opening and a hinged plate chute closing the opening and directing toothpicks (or matches, etc.) from the compartment selectively upon a collecting drum.

It is a still further object of this invention to provide a means for manually turning the drum a sufficient distance to discharge the toothpicks individually for use.

Another one of the objects of this invention is the provision of means for vibrating the hinged plate chute as the drum is turned so as to cause the toothpicks to flow in a selective stream to the collecting drum.

A still further object of this invention is the construction of a device of the class mentioned which is of simple durable construction, dependable in use and efficient in operation and which can be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure—

Figure 1 is a mutilated front elevational view of a device constructed according to this invention with portions thereof broken away to disclose interior parts.

Fig. 2 is a side elevational view of Fig. 1, shown with one of the casing covers removed and a portion of the casing broken away to disclose interior parts.

Fig. 3 is a perspective view of the device shown in Fig. 1.

Fig. 4 is a horizontal sectional view taken on the line 4—4 of Figs. 1 and 2.

Fig. 5 is a fragmentary detailed view of a portion of Fig. 2 showing particularly the tooth lever acting against the ratchet wheel used for the purpose of vibrating the plate chute.

And Fig. 6 is a detail view of the enlarged tooth ratchet with its pawl, used to slightly oscillate the hinged plate chute to prevent the material sticking or bunching.

Like numerals refer to like parts throughout the several views.

The toothpick dispenser, according to this invention, comprises a toothpick compartment 10 having an inclined bottom 11 with an opening 12 closed by a hinged plate chute 13. The compartment 10 is formed by a casing 14 and is accessible by reason of a hinged side 15 of this casing. Numeral 16 indicates the hinge of the side which can be pivoted open as indicated by the dot and dash line 17 in Fig. 3. A screw 18 passes through an aperture 19 in the side and threadedly engages into the top of the casing for the purpose of normally holding the casing in the closed position. At the front the casing is formed with a window opening 20 closed by a transparent sheet 21 so that the toothpicks may be viewed within the casing. The casing 20 is mounted upon a disc base 22. The inclined bottom 11 is spaced quite some distance above the base 22 so as to provide a compartment 23 in which the mechanism for dispensing the toothpicks selectively is mounted.

The dispensing mechanism comprises a transverse shaft 24 rotatively mounted between the sides of the casing 14. A drum 25 is fixed upon the shaft 24 and is formed with several peripheral spaced grooves 26. The plate chute 13 discharges against one side of the drum 25. This drum is formed with a plurality of transverse peripheral grooves 27 of substantially V-shape so that toothpicks discharged along the chute 13 may be selectively picked up by the grooves 27. It should be noted in Fig. 2 that a line of toothpicks 58 is shown passing down the chute plate 13 and being loaded within the grooves 27. The bottom 11 of the toothpick compartment 10 is formed from sections overlapping in the vicinity of the numeral 29 and adjustably connected so that the clearance space between the lower edge of the inclined bottom and the plate chute 13 may be adjusted for the proper delivery of toothpicks.

A transverse support member 30 is mounted between the sides of the casing 14 and supports springs 31 which engage partially around the periphery of the drum 25 and serve to hold the toothpicks which are within the groove 27 from being accidentally displaced. A pick-up plate 32 is mounted between the sides of the casing 14 and has prongs 33 engaging into the peripheral grooves 26 for the purpose of lifting the toothpicks from their grooves and discharging them to the exterior. The casing 14 has a bottom opening 34 through which the pick-up plate 32 extends. This pick-up plate has a vertical portion 35 and terminates at the bottom in a curved portion 36 which is adapted to receive and hold toothpicks discharged. The springs 31 extend to but a short distance from the vertical prongs 35 and serve to hold the toothpicks which are on the descent from falling down until the proper time.

A means is provided for turning the drum 25 one motion at a time and comprises a ratchet wheel 38 fixed upon the shaft 24. A hand lever 39 is pivotally mounted at one end 40 upon the side of the casing 14. A hook 41 is pivotally mounted at the point 42 on the hand lever 39. A spring 43 is connected between the hook 41 and the side of the casing 14 and acts to normally urge the hand lever 39 upwards. A second spring 44 is attached upon the hook 41 and upon a pawl 45 which is hingedly mounted at 46 and engages against the teeth of the ratchet 38. The hook 41 also engages against the teeth of the ratchet. When the handle 39 is depressed to the position indicated by the dot-and-dash lines 47, the drum will be turned. The pawl 45 will prevent back turning of the drum and cause the hook 41 to idle up over the teeth of the ratchet wheel when the handle is released. A cover 48 is attached upon the outer side of the casing 14 and serves to house the mechanism which is provided for turning the drum. This cover is formed with a slot 49 through which the hand lever 39 projects so that it may be manually depressed as indicated by the hand 50.

A means is provided for slightly oscillating the hinged plate chute 13 as the drum 25 turns. This means comprises a second ratchet wheel 51 attached upon the shaft 24 which is extended from the opposite side of the casing 14 to that of the end upon which the ratchet 38 is mounted. A toothed lever 52 is supported from the chute 13 and is resiliently urged against the teeth of the ratchet 51 by a spring 53 so as to cause oscillating or moving of the lever 52 as the ratchet turns. More particularly, the lever 52 is attached upon a bar 54 which is connected to an arm 55, Fig. 2, attached at its top upon the chute 13. The spring 53 is connected to the arm 55. The dot-and-dash lines 57 indicate the vibrating parts in another position of vibration. The vibration of the chute plate will cause the toothpicks 58 within the toothpick compartment to flow in a nice stream towards the collecting drum.

Furthermore, a means is provided for adjusting the amplitude of vibration of the plate chute 13 to allow for the proper control of the stream of toothpicks. This means comprises the provision of a tooth 59 projecting from the tooth lever 52, and said tooth being formed with a slot 60 engaged by a set-screw 61 to provide for adjustable mounting. Thus the extension of the tooth may be adjusted and in this manner the amplitude is controlled. A cover plate 63 is attached upon the other side of the casing 14 so as to cover the ratchet 51 and the other mechanism. An opening 64 is formed in the side of the casing 14 to allow for the passage of the rod 54.

The detail in Fig. 6 shows more clearly the four enlarged teeth on the ratchet 51 for the purpose of giving a periodic extra shake or vibration to the hinged plate 13, to momentarily provide a wider opening between plate 13 and the adjacent end of bottom member 11, to permit the toothpicks, when they become jammed together at the opening, to free themselves and drop below. Here, the toothed lever 52 is shown without its adjustable tooth 59, Fig. 5, as an alternative construction. Spring 53, which holds the end of 52 resiliently in engagement with the teeth of 51, is anchored at its opposite end in a hole (or to a pin) of casing 14.

A bent plate 65 is fastened to a support 66 in the position shown in Fig. 2, its lower end having projections extending into the grooves 26 of Fig. 4. This plate retains only a small quantity of toothpick and serves to reliably feed them one at a time into the dispensing grooves 27, acting also to provide a reserve supply to bridge over any failure of the parts above to supply the articles regularly. This is an added feature of great importance.

It is to be understood that the present disclosure is for the purpose of illustration only, and that the invention is not limited thereto. To those skilled in the art, many modifications of the invention will be readily apparent, and it will also be obvious to such skilled persons that part of the method and means may be used without other parts thereof, many such combinations readily suggesting themselves. Therefore, it should be and is to be distinctly understood that for a definition of the limitations of the invention, reference must be had to the appended claims.

Having now described the invention, what is claimed as new and for which Letters Patent of the United States is desired, is:

1. A toothpick dispenser, comprising a toothpick compartment having an inclined bottom with an opening, a collecting drum rotatively mounted below the inclined bottom and being formed with transverse peripheral notches for selectively receiving toothpicks, a hinged plate chute closing the opening of said inclined bottom and discharging against the side of said collecting drum, means for turning said drum one notch at a time, a ratchet wheel connected to rotate with said drum, an adjustable toothed lever supported from said chute plate, and resilient means for urging the tooth of said lever against said ratchet wheel and urging the chute plate into its closed position, said tooth of said toothed lever being adjustable in such manner as to be extendable to various projected distances, so as to control the amplitude of motion of the hinged plate chute as the ratchet wheel turns.

2. In a dispenser for toothpicks and the like, a compartment having an inclined bottom with an opening, a collecting drum rotatively mounted below the inclined bottom and being formed with transverse peripheral notches for selectively receiving toothpicks, a hinged plate chute closing the opening of said inclined bottom, and means including a pawl and ratchet wheel with both large and small teeth and rotatable with the drum for vibratingly varying the said opening to more effectively feed the toothpicks therethrough.

3. The invention as in claim 2, including an inclined member between the inclined bottom and the drum, and adapted to receive the toothpicks from the former and feed them singly to the latter.

FRANK A. BRUNNER.